(12) United States Patent
Flecker et al.

(10) Patent No.: US 7,059,404 B2
(45) Date of Patent: Jun. 13, 2006

(54) VARIABLE INTENSITY MEMORY GRAVEL PACK IMAGING APPARATUS AND METHOD

(75) Inventors: Michael J. Flecker, Sugarland, TX (US); Larry Stephenson, Kennedale, TX (US); J. Thomas Hampton, III, Houston, TX (US)

(73) Assignee: Core Laboratories L.P., Houston, TX (US)

( * ) Notice: Subject to any disclaimer, the term of this patent is extended or adjusted under 35 U.S.C. 154(b) by 222 days.

(21) Appl. No.: 10/424,309

(22) Filed: Apr. 28, 2003

(65) Prior Publication Data

US 2004/0020646 A1 Feb. 5, 2004

Related U.S. Application Data

(63) Continuation-in-part of application No. 09/447,393, filed on Nov. 22, 1999, now Pat. No. 6,554,065.

(51) Int. Cl.
*E21B 43/04* (2006.01)
*E21B 47/00* (2006.01)
*G01V 5/04* (2006.01)

(52) U.S. Cl. ............... 166/250.02; 166/66; 166/253.1; 166/254.2; 166/278; 175/41; 378/198; 73/152.14; 250/269.1

(58) Field of Classification Search ............... 166/247, 166/250.01, 255.1, 250.02, 253.1, 254.1, 166/254.2, 278, 51, 65.1, 66; 175/40, 41; 324/323–369; 376/160–166, 108–119, 191; 378/44, 45, 46, 49, 50, 70, 86, 88, 89, 197, 378/198; 73/152.14, 152.54; 250/269.1
See application file for complete search history.

(56) References Cited

U.S. PATENT DOCUMENTS

| | | | | |
|---|---|---|---|---|
| 2,334,262 A | * | 11/1943 | Hare | 250/265 |
| 2,991,364 A | * | 7/1961 | Goodman | 250/262 |
| 3,013,156 A | * | 12/1961 | Hearn | 250/265 |
| 3,514,598 A | * | 5/1970 | Youmans | 376/162 |
| 3,708,013 A | | 1/1973 | Dismukes | |
| 3,781,545 A | * | 12/1973 | Paap et al. | 376/163 |
| 3,796,883 A | | 3/1974 | Smith et al. | |
| 4,092,536 A | * | 5/1978 | Smith | 250/265 |
| 4,181,014 A | | 1/1980 | Zuvela et al. | |
| 4,393,932 A | | 7/1983 | Bodine | |
| 4,423,323 A | | 12/1983 | Ellis et al. | |
| 4,459,480 A | * | 7/1984 | Dimon | 250/269.5 |
| 4,467,642 A | * | 8/1984 | Givens | 73/152.11 |
| 4,587,423 A | * | 5/1986 | Boyce | 250/269.3 |
| 4,656,354 A | | 4/1987 | Randall | |

(Continued)

OTHER PUBLICATIONS

CoreLab, Imaging-PackScan(TM) Gravel Pack Density Imager, Nov. 4, 2002, 5 pages.*

(Continued)

*Primary Examiner*—Jennifer H. Gay
(74) *Attorney, Agent, or Firm*—Madan, Mossman & Sriram, P.C.

(57) ABSTRACT

An apparatus and method are provided for varying an operating parameter for a nuclear gamma ray tool for evaluating the integrity of gravel packing. The gamma ray outpat intensity and area of investigation are altered by changing a source housing geometry and the material from which the source housing is made. An actuator is provided to slide a variable electron density sleeve over the source and to vary the area of investigation by changing the distance between the source and a detector.

19 Claims, 6 Drawing Sheets

U.S. PATENT DOCUMENTS

| | | | |
|---|---|---|---|
| 4,691,772 A | | 9/1987 | Ebenhack et al. |
| 4,742,496 A | * | 5/1988 | Jennings et al. ............... 367/35 |
| 4,760,252 A | * | 7/1988 | Albats et al. .......... 250/390.07 |
| 4,783,995 A | | 11/1988 | Michel et al. |
| 4,950,892 A | * | 8/1990 | Olesen .................... 250/269.7 |
| 5,205,167 A | * | 4/1993 | Gartner et al. ........... 73/152.14 |
| 5,237,594 A | * | 8/1993 | Carroll ....................... 376/160 |
| 5,252,832 A | * | 10/1993 | Nguyen et al. ........ 250/390.01 |
| 5,481,105 A | * | 1/1996 | Gold .......................... 250/266 |
| 5,521,378 A | * | 5/1996 | Roscoe et al. ........... 250/269.6 |
| 5,829,520 A | | 11/1998 | Johnson |
| 6,300,762 B1 | * | 10/2001 | Thomas et al. ............. 324/339 |
| 6,552,333 B1 | * | 4/2003 | Storm et al. ............. 250/269.3 |
| 6,781,115 B1 | * | 8/2004 | Stoller et al. ............... 250/266 |
| 6,815,665 B1 | * | 11/2004 | Storm et al. ............. 250/269.3 |
| 2002/0060066 A1 | * | 5/2002 | Fisher et al. .......... 166/250.01 |
| 2002/0153481 A1 | * | 10/2002 | Stoller et al. ............... 250/266 |
| 2003/0106993 A1 | * | 6/2003 | Chen et al. ............... 250/269.1 |
| 2003/0213898 A1 | * | 11/2003 | Storm et al. ............. 250/269.3 |

OTHER PUBLICATIONS

CoreLab, Imaging-PackScan(TM) Gravel Pack Density Imager, Aug. 19, 2002, 6 pages.*

CoreLab, Imaging-Washpipe Conveyed SpectraScan Imaging, Jan. 2005, 2 pages.*

CoreLab, Imaging-PackScan(TM) Gravel Pack Density Imager, Jan. 2005, 2 pages.*

CoreLab, Imaging-SpectraScan Imaging, Jan. 2005, 2 pages.*

CoreLab, Imaging-Completion Profiler, Jan. 2005, 3 pages.*

S.S. Sollee; *Gravel-Pack Logging Experiments*, 60th Annual Technical Conference and Exhibition of the Society of Petroleum Engineers, Sep. 22-25, 1985, SPE 14163, pp. 1-10.

* cited by examiner

VARIABLE INTENSITY MEMORY GRAVEL PACK IMAGING APPARATUS AND METHOD

CROSS REFERENCE TO RELATED APPLICATIONS

This patent application is a continuation-in-part of and takes priority from U.S. patent application Ser. No. 09/447,393 filed on Nov. 22, 1999 entitled "Memory Gravel Pack Imaging Apparatus and Method" (U.S. Pat. No. 6,554,065, issuing on Apr. 29, 2003).

BACKGROUND OF THE INVENTION

1. Field of the Invention

This invention relates to well logging tools and methods, and more particularly to a memory logging tool having a variable output radiation field intensity and variable area of the investigation for evaluating the degree of gravel packing.

2. Description of the Related Art

A vast array of tools are utilized to log oilfield wells during drilling and completion, and production phase of such wells. These logging tools obtain measurements relating to the drilling operation, wellbore condition and characteristics of the formation surrounding the wellbore. After drilling the wellbore to a desired depth, and before allowing it to produce hydrocarbons from a hydrocarbon-containing subsurface formation, the wellbore is made ready or "completed."

The completion operations usually include, among other things, lining the wellbore with a casing made of jointed metal tubulars, filling the annulus between the casing and the well with cement, installing sand screens, and perforating the casing and the formation at selected depths across from the hydrocarbon-containing strata to allow the hydrocarbons to flow from the formation to the wellbore. The formation fluid flows from the formation into the well via the perforations because the formation pressure is greater than the pressure in the well.

The free flow of the formation fluid into the well causes sand in the formation to flow into the well at relatively high flow rates, which can erode the tubular and other equipment in the wellbore. Such other equipment includes flow control valves, sensors, safety devices usually installed in the well to control fluid production through the well and for safety reasons.

One or more metallic screens, usually referred to as sand control screens, are placed in the wellbore to prevent inflow of formation solid particles (fines). Gravel is packed between the formation or casing and the production tubing to inhibit sand flow into the production tubing. Proper gravel packing is a critical step in the completion of a well.

Numerous gravel packing methods or procedures have been developed to inject sand or proppant into the annulus between the permeable screen and the production tubing in high permeability formations. As noted above, the annular sand pack performs the function of filtering formation solid particles which migrate into the well so that they cannot plug or limit production and to eliminate the erosion effects of the produced sand, which can damage the wellbore equipment, and in extreme cases cause the loss of the well. These procedures are referred to in the oil and gas industry as Gravel Pack, Frac Pack, Water Pack, etc., each of which is designed to provide essentially the same function—to completely and tightly fill the screen/casing annulus with sand or poppant with no voids or partially packed intervals. The gravel pack depth can range from a few (10) to several thousand (1000–5000) feet. The gravel pack acts as a filter that prevents the entry of formation fines into the wellbore without restricting the flow of the formation fluids. It is thus important to determine the integrity of the gravel pack. The success of the gravel pack and the longevity of the wellbore depends upon the extent and continuity of the gravel pack within the annulus.

The effectiveness of gravel placement in the screen-casing annulus or behind the casing (such as when prepacking perforation tunnels) is normally evaluated with treatment-pressure data. Darcy's law, volumetric calculations along with treatment pressure evaluation and pressure testing methods are used to estimate the level of gravel fill, with the minimum requirement being that the sand level must extend into the blank pipe above the top of the screen. This allows for the potential future settling of the sand. A direct measurement locating the top of the gravel pack and the quality or continuity of the sand fill within the annulus is preferred. Such measurements can be utilized to improve the above-noted treatment pressure data derived estimates. The continuity or absence of significant voids within the packed annulus is best evaluated with a direct measurement. Locating the voids soon after the completion is important because such voids can not normally be detected with the pressure evaluation methods. Voids can require workover of the gravel pack, and in extreme cases, can even lead to complete failure of the well.

At present, voids in the gravel-packed screen-casing annulus are usually evaluated from data from density, neutron, gamma-tracer or pulsed-neutron logs. These logs are usually obtained by wireline logging tools, which require a separate trip into the well and are often not performed promptly after finishing gravel packing. Also, when radioactive materials are used for evaluating proppant placement, gamma measurements are affected by the background signals produced by such radioactive materials. These background signals make the conventional density and pulsed-neutron silicon-activation methods relatively ineffective.

The ability to alter output radiation intensity from a source sub is necessary to provide optimum log response in a variety of different logging environments. Control of source sub output intensity is traditionally accomplished by varying the intensity of an internal radioactive source. Because of the expense of a radioactive source and the problems associated with radioactive sources, it is problematic to have a large assortment of radioactive sources of varying intensities or Isotopes to meet the needs of varying logging environments. The major problems associated with producing several different radioactive sources are radiation safety, exposure, logistics, management, and hazardous waste. Thus there is a need for a method and apparatus that enables efficient alteration of the output radiation intensity from a nuclear source sub.

SUMMARY OF THE INVENTION

The present invention provides a system for efficient alteration of the output radiation intensity from a source sub for determining the integrity of a gravel packing system by a memory logging tool. The present invention provides a high resolution, memory logging tool that directly evaluates the effectiveness of the gravel packing operation by measuring changes in the bulk density of the annular region of the gravel pack, wherein the measurements are not affected by the presence of radioactive tracers. The present invention alters nuclear radiation output intensity by adjusting three separate parameters for the nuclear source sub. These three parameters are $\mu_m$, the mass alteration coefficient of the material from which the source sub housing surrounding the nuclear source is made; $\rho$, the bulk density of the source sub housing; and t, the thickness of the source sub housing material. These three parameters can be altered by changing source housings at the surface or by issuing commands from a processor downhole to cause an actuator to change the source output intensity or area of investigation. The distance between the source and detector is also adjustable to alter the area of investigation. The source sub length can be adjusted while operating down hole to optimize measurements and enable optimal measurement in a wellbore having more than one geometry or condition at different depth intervals.

The gravel packing system includes a screen disposed in an annulus between the wellbore and a production tubing. A tubing, such as a wash pipe, disposed in the production tubing provides a fluid path from the surface to the screen. A fluid inflow port in the tubing provides a return fluid path from the screen to the tubing and to the surface. A memory logging tool carried by the washpipe is located in the tubing below (downhole) of the screen. Slurry containing gravel is pumped from the surface to the screen. The fluid returns to the surface via the in port. The tool includes a source of nuclear energy, gamma ray detector, a memory for storing data and a battery pack. Upon the completion of the gravel pack operations, the tubing with the memory logging tool is retrieved from the well at a selected speed. The tool is activated to record data as it passes across the screen. The data is stored in the memory, which is downloaded when the tool is retrieved at the surface to provide a log to determine the integrity of the gravel packing of the screen.

The tool may be operated in a continuous mode by activating the tool at the surface prior to deployment. Preferably, the tool is set at a sleep or inactive mode at the surface and activated upon the occurrence of a predefined condition. The tool may be activated when the wellbore pressure reaches or exceeds a predetermined threshold or by remotely activating it from surface or by providing a preset time delay, or by sensing the movement. The tool may include a plurality of collimated detectors, each obtaining data corresponding a particular gravel pack zone of interest.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended thereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF A PREFERRED EMBODIMENT

Figure 1:
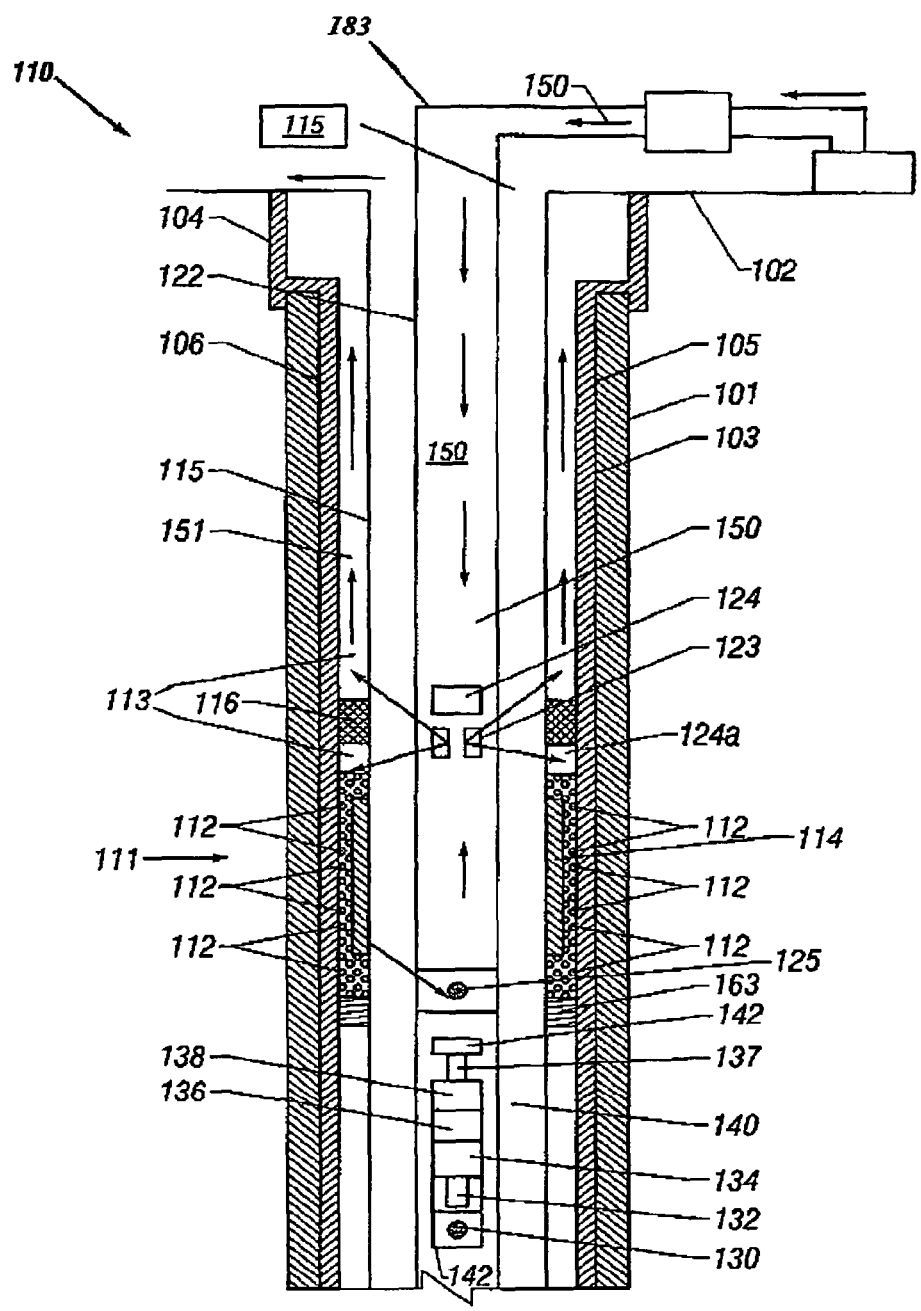
FIG. 1 is a schematic diagram, showing a memory-logging tool according to one embodiment of the invention disposed in a tubing during a gravel packing operation.

FIG. 1 shows a schematic diagram of the memory logging tool placed in a wellbore during an exemplary gravel packing operation. FIG. 1 shows a wellbore 101 formed from a surface location 102 to a desired depth. The wellbore 101 is lined with a casing 104 to a shallow depth from the surface. A wellbore liner or casing 106 is shown placed from the casing 104 along the length of the wellbore 101. Cement 103 is filled in the annulus 105 to set the liner 106 in the well to recover hydrocarbons from a subsurface hydrocarbon-containing formation or reservoir, such as reservoir 110. Perforations 112 are made through the liner 106 and into the formation 110 to allow the formation fluid to flow to the wellbore 101.

A production tubing 115 placed in the well acts as a conduit for the flow of hydrocarbons 111 to the surface 102. One or more screens, such as screen 114, are placed in the annulus 113 between the perforations 112 and the production tubing 115. A packer 116 is placed in the annulus between the casing 106 and the production tubing 115 above or uphole of the screen 114, which packer prevents the fluid flow through the annulus 113 above the packer 116. The screen 114, which is usually a metal screen, is packed with gravel to prevent flow of formation solids into the production tubing 115 and to reduce the velocity of the formation fluids entering the production tubing 115.

In one gravel pack method, a tubing, such as a wash pipe 122, is conveyed into a wellbore 101. A memory gamma ray tool 140 made according to the present invention is attached inside the tubing 122 at a depth 142 which can be below or downhole of the screen 114. The tubing 122 includes an outflow port 123 that allows fluid 150 pumped under pressure from the surface to flow to the screen 114. A valve 124 opens when the pipe 122 moves. The tubing 122 has a crossover tool (sliding sleeve) not shown, that allows the fluid 151 to flow from the screen 114 to the tubing 122, which is returned to the surface via passages (not shown) provided therefore.

Still referring to FIG. 1, the memory logging tool 140 includes a nuclear source 130, such as a gamma ray source or a neutron source to generate gamma rays or neutrons as the case may be into the borehole. The tool 140 includes one or more spaced apart gamma ray or neutron detectors 132, usually 6 to 24 inches apart. In the case of a gamma ray source, gamma rays are emitted from the source 130, which travel from the tool 140 to the screen 114 and into the annular space 113. The spacing between the source 130 and the scintillation detector(s) 132 is chosen so that the majority of the gamma rays are scattered within a defined annulus with minimal gamma rays penetrating the formation 110. The detectors 132 receive the scattered gamma rays and provide a corresponding count rate. In the above-described configuration, this count rate or volume is proportional to the amount of scattering to which the gamma rays are subjected in the defined annulus. The degree of scattering is a result of the concentration or the bulk density of the sand or proppant filling the annulus 113. The size of the gamma source 130 and detectors 132 are selected to produce a relatively large density count rate wherein most of the counts are due to the energy of the source 130 and a much smaller percentage of the counts are due to isotopes (if any) injected into the formation 110. This allows the use of the tool 140 to determine whether the annular pack is of sufficient concentration that will prevent sand flowback and whether the quality of the annular pack should be improved through an intervention technique. The tool 140 further includes detector electronics (electrical circuits and processors) 134 and a memory section 136. Power to the tool electronic section and memory section is provided by batteries in a battery section 138.

The detector 132 includes a detector such as a sodium iodide crystal and a photo-multiplier tube that converts the light signals (proportional to the received gamma rays by the crystal) to electric signals. The electronic section 134 processes these signals to determine the count rate and the energy level for such counts. The data generated by the electronic section 134 is stored in the memory 136 for downloading after the retrieval of the tool 140 to the surface.

To determine the effectiveness of the gravel pack operations, the tubing 122 with the associated equipment (not shown) and the memory logging tool 140 is located in the manner shown in FIG. 1, such that the memory tool 140 is located below the screen 114. Slurry 150 containing gravel or sand is pumped by a pump 160 from a source 162. The pipe movement opens the valve 124, thereby allowing the gravel slurry 150 to pass to the screen 114 via opening 124a. The gravel is packed in the screen 114 and the fluid 150 substantially without the gravel leaves the screen 114 and enters the tubing 122 via an inlet or inflow port 125. The fluid 151 returns to the surface 101.

The gravel continues to pack the screen 114, which process can take several hours. As the gravel packs, the pressure at the screen continues to increase. The gravel pack operator sets parameters at a predetermined pressure, above which it is presumed that the gravel packing has been accomplished and the process is stopped. In one embodiment, the memory logging tool 140 includes a pressure switch or pressure sensor 137 which is preset to a pressure threshold that is expected to be attained during the gravel packing operations. When this pressure threshold is exceeded, the tool 140 enters a wake-up mode, calibrates itself and becomes ready for the logging operation and starts to record data. Alternatively, a time delay may be provided before the tool 140 is activated to record data. The tool may also be set at the surface to continuously record the data or it may be remotely-activated from the surface by any suitable telemetry methods, including communicating control signals to the tool 140 in the well 101 by acoustic pulses, electromagnetic signals or pressure pulses. Accelerometer(s) may also be installed in the tool 140, which activate the tool 140 upon sensing tool movement due to the retrieval of the tubing 122 from the wellbore 101. In any event the tool 140 is activated to record data when the tubing 122 is retrieved from the well 101. When the tool is moved out of the well, the accelerometer sensor signals may be utilized to activate the tool.

At the conclusion of the gravel pack pipe operation, the tubing 122 is retrieved at a selected speed, thereby allowing the tool 140 to traverse the entire length of the gravel-packed section at such speed (the logging speed). The gamma ray log for the gravel-packed section is recorded in the memory 136 of the tool 140. Upon retrieval of the tool 140 from the well 101, the memory 136 is downloaded and a wellsite plot of count versus depth obtained, which provides the condition of the gravel pack and thus the effectiveness of the gravel pack operation and the integrity of the gravel-packed section. The logs may include count rate curves from one or more of the detectors 132 scaled such that high pack density and low pack density areas are relatively easily identified.

An important feature of the memory logging tool 140 is the ability to run the tool 140 on a variety of hoisting mechanisms because the tool 140 can be run on a coiled tubing, rope or chain, slickline, wireline or any other suitable conveying device. Conventional electric wireline, slickline or non-electric wireline, coiled tubing and actual work siring or wash pipe (132) used in the gravel pack procedure can be utilized to deploy the memory logging tool 140 into and out of the wellbore 101. Because of the high cost of well intervention with the wireline tools, washpipe, such as 122 show in FIG. 1, is the preferred method of tool deployment. With this method, as noted above, the bottom of the tool 140 is placed inside the washpipe at or below the sump packer 163, which usually is the lower most seal between the screen 114 and the casing 106. The memory logging tool 140 with a finite amount of memory 136 and available battery packs can be put into a "sleep" mode whereby the major power consuming devices of the tool 140 are inactive during gravel pack operations, thus saving battery power. The tool 140 does not record substantial amounts of data during the sleep mode, thus preserving memory for the actual logging trip out of the wellbore 101.

An additional benefit of the present invention is that the washpipe tool transport mode requires no additional rig time as is required by wireline trips. Rig time costs offshore can run tens of thousands to hundreds of thousands of dollars per day. As noted above, the present tool may also be operated in other modes, including initializing the tool logging mode with a programmed time delay, with an accelerometer which uses tool movement due to retrieval of the tool 140 from the well 101 to activate the tool. The tool may be operated continuously during trip into and out of the wellbore.

Figure 2:
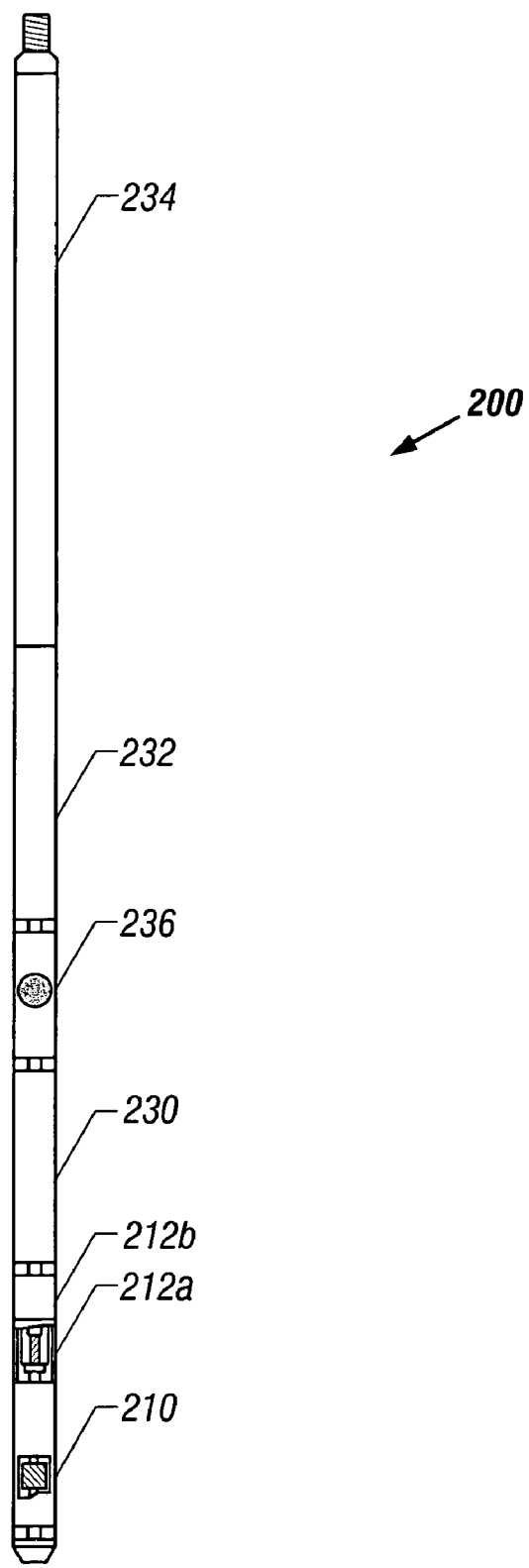
FIG. 2 shows a schematic diagram of a memory logging tool utilizing a plurality of collimated detectors according to an alternative embodiment of the present invention.

FIG. 2 shows an alternative embodiment 200 of the memory logging tool of the present invention. The tool 200 includes a gamma ray source 210 and a plurality of collimated spaced-apart detectors. FIG. 2 shows two such spaced-apart detectors 212a and 212b. Each such detector may be arranged on the tool to evaluate a proportional degree of the circumference of the sand control screen. The tool 200 also includes a microprocessor-based control circuit 230, a memory module 232 and a battery pack 234. A pressure switch 236 may be provided to activate the tool as described above. Other activation methods, as described above in reference to FIG. 1, may also be utilized.

The tool 200 can be azimuthally oriented such that the degree and location of any imperfections or voids in the gravel pack can be detected. The tool 200 may include two or more collimated detectors with an orientation package referencing one of the detectors to the high side of the tool in the wellbore. This is especially useful in horizontal or deviated wells, thus, any imperfections or voids sensed by the detectors can be located with reference to the high or low side of the wellbore and can be quantified as a percent of the circumference of the packed or unpacked areas.

Figure 3:
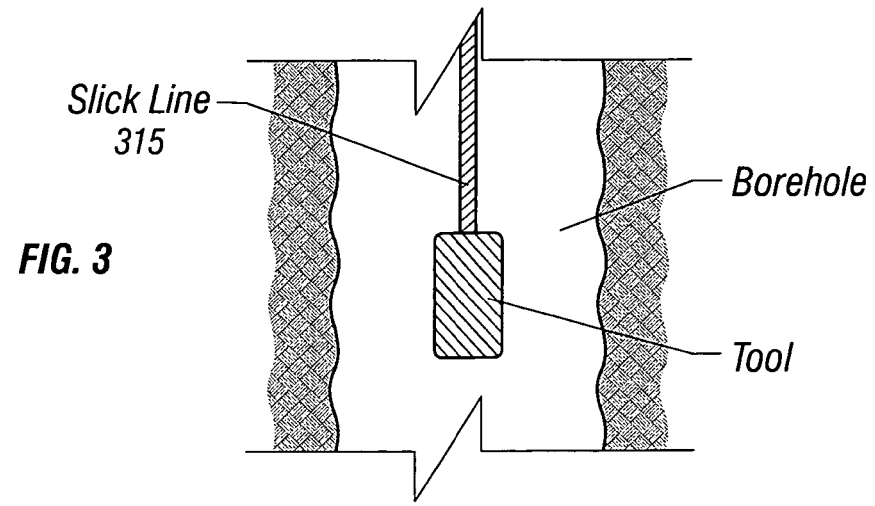
FIG. 3 shows the present invention deployed on a slickline.
Figure 4:
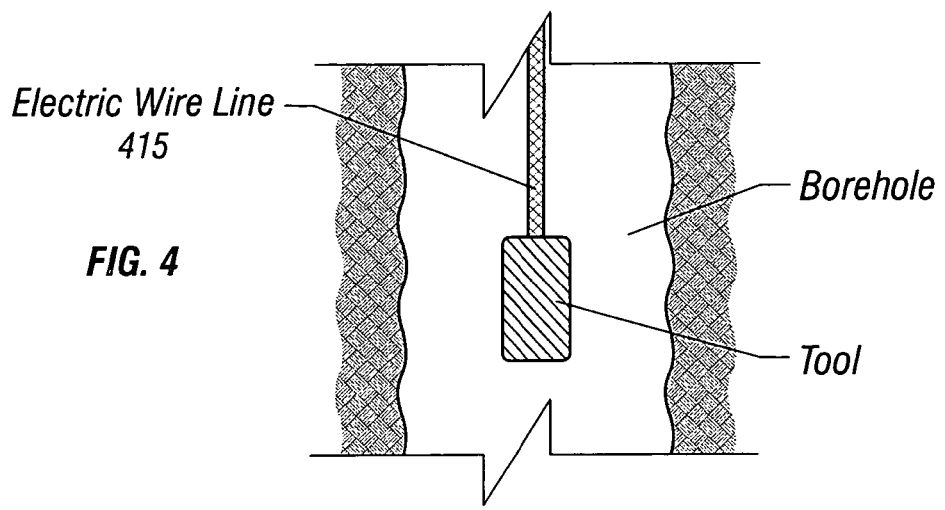
FIG. 4 shows the present invention deployed on an electric wireline.
Figure 5:
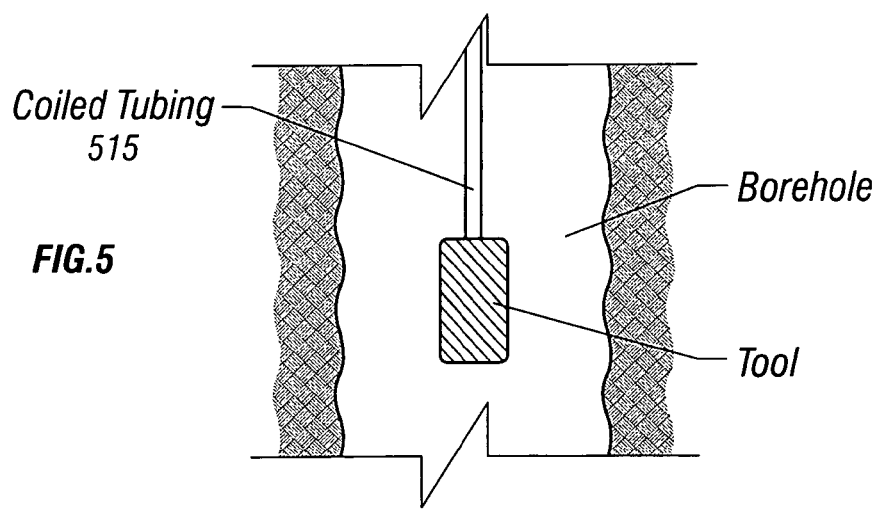
FIG. 5 shows the present invention deployed on a coiled tubing.

FIG. 3 shows the present invention deployed on a slickline 315. FIG. 4 shows the present invention deployed on an electric wireline 415. FIG. 5 shows the present invention deployed on a coiled tubing 515.

Thus, the present invention provides a self-contained, self-powered memory logging tool for evaluating the integrity of gravel pack in a wellbore annulus, wherein the tool is placed below the annulus to be gravel packed prior to gravel packing the annulus and the tool is retrieved subsequent to gravel packing to record logging data in the tool memory, which data is downloaded at the surface to obtain a log for determining the integrity of the gravel pack.

The present invention enables the variation of output radiation intensity to optimize the log response in a variety of different logging environments. The size of the wellbore or geometry of the wellbore can change during a logging run. Moreover, the screen size and casing size can vary during a logging run. The present invention provides a method and apparatus to alter the output intensity down hole during a run or uphole before a logging run by changing the size of the nuclear source; changing the material from which the sub source housing is made or by changing the thickness of the sub source housing.

Figure 6:
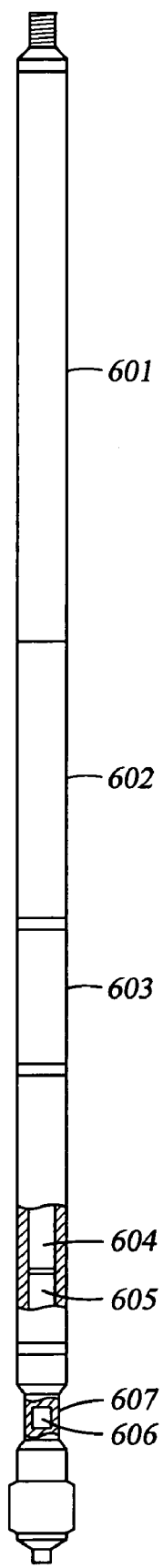
FIG. 6 illustrates the source housing and detectors in a preferred embodiment.

Turning now to FIG. 6, a schematic representation of the present invention is illustrated. AS shown in FIG. 6, the present invention resides in a tool comprising a battery 601, memory 602, microprocessor 603, long spacing detector 604, short spacing detector 605, gamma ray source 606, and gamma ray sub source housing 607. The intensity of the gamma ray out put can be varied by the present invention by changing the sub source housing 607. A plurality of housing are provided having variable thickness 701 and variable lengths 702, 702A. The output intensity changes as a function of the thickness 701 of the material of which the source housing is made. The thicker the material between the source and the outside of the source housing, the less the intensity. The area of investigation changes as the distance between the source and detector changes.

The sub source housing 703 thickness or outside diameter 701 can be larger than the greatest outside diameter as shown by dashed line 701A. The outside diameter 704 of the section of the source sub housing above the source can be larger 704A to provide a borehole excluder to force the gamma rays outside into the borehole wall in an accurate path to prevent gamma rays from traveling directly from the source to the detectors and avoiding the borehole wall area of investigation.

Figure 7A:
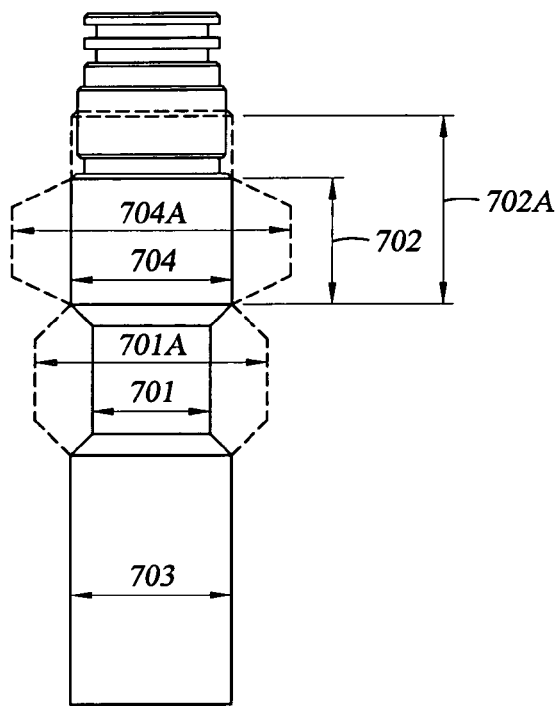
FIG. 7 illustrates the variable diameter and thickness for the source housing.
Figure 7B:
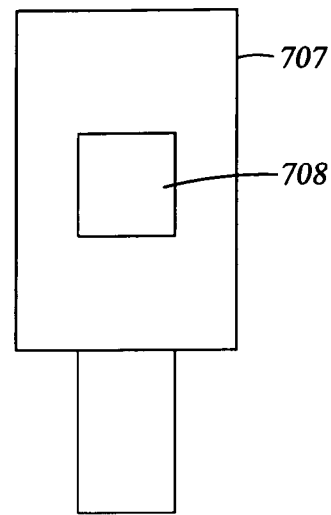
Figure 7C:
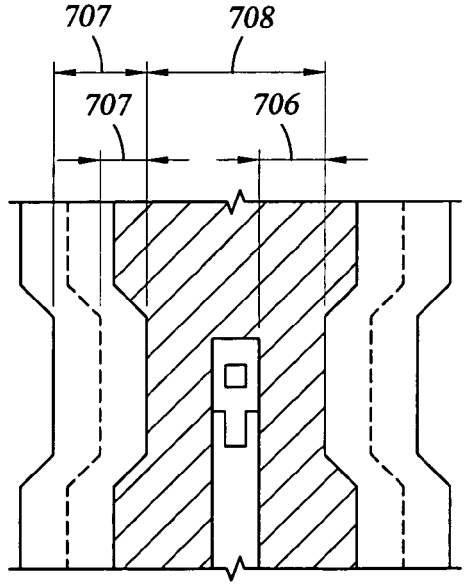
Figure 7D:
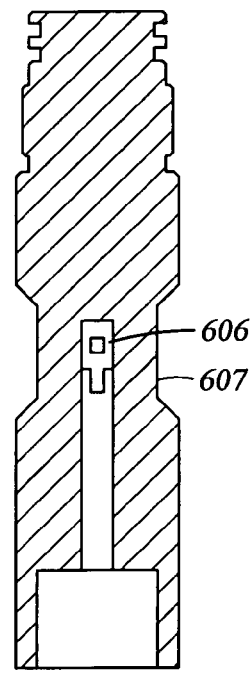

FIGS. 7D and 7B show a cross section of the source sub housing a nuclear source 606. Nuclear source 606 comprises a sealed radioactive source 707 inside of a housing 708. The housing 708 is made of different material known to have variable election density and having a thickness 706.

As shown in FIG. 7B, the thickness 707 of the material is variable and can be selected by choosing between a variety of different housings provided by the present invention each having a different outside diameter 701, inside diameter 708, thickness 707 and material electron density. The housing can be made of titanium or copper berillium to change the election density. Many materials having different electron densities known in the art are suitable.

Figure 8A:
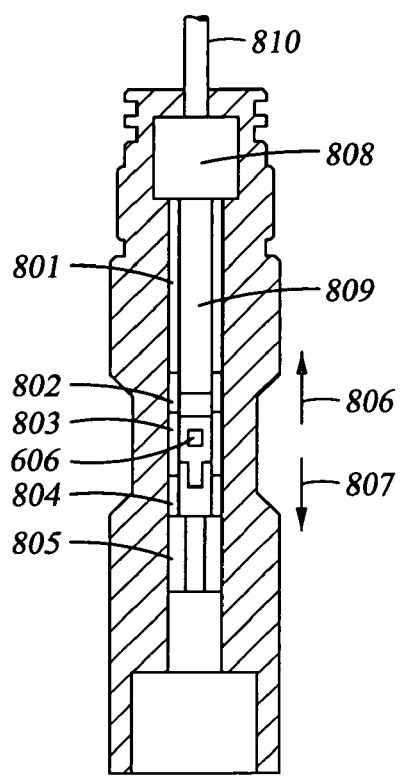
FIG. 8 illustrates the actuator in a preferred embodiment for varying the output intensity and area of investigation

Turning now to FIG. 8A, in a preferred embodiment a sleeve 801 having a plurality of materials 802, 803, 804 and 805 each having a different election density or bulk density each having a different effect on the radiation intensity emitted from the sub source housing are moved along the longitudinal axis of the sub source housing up 806 and down 807. The sleeve 801 is attached to an actuator 808 which moves the sleeve. The actuator is preferably an electromechanical device well known in the an for example, a ball screw. The actuator 808 can also be a electromechanical e.g. ball screw, hydraulic, e.g. moveable piston 810 known in art.

Figure 8B:
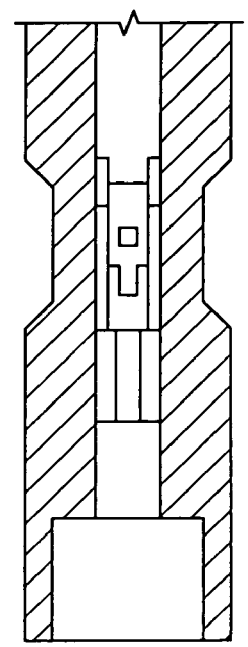
Figure 8C:
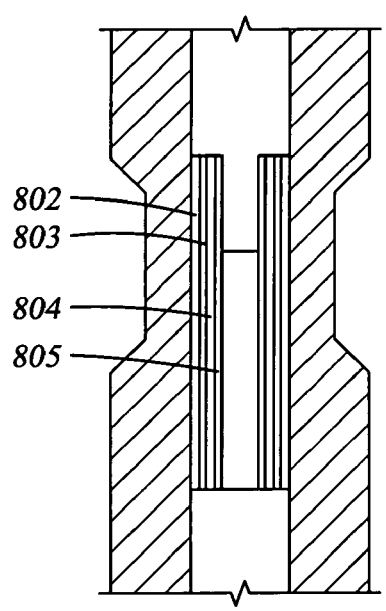

FIG. 8B shows a cross section of the actuator and variable election density shield of FIG. 8A. In an alternative embodiment, the nuclear source 606 is attached to rod 809 which is moved up 806 and down 807 the longitudinal axis of the tool source sub housing actuator 808. Varying the position of the nuclear source changes the distance between the source and detector thereby enabling the changing of the area of investigation while down hole during logging.

By adjusting these three separate parameters, the source sub output characteristics are adjusted to meet the requirements of the logging environment without the need for multiple radioactive sources.

These variables are based on the following equation:

$$I = I_0 e^{-t\mu_m \rho}$$

$I_o$ = Original Source Intensity
$I$ = Controlled Output Intensity
$t$ = thickness of material between source and outer source sub housing (cm)
$\mu_m$ = mass attenuation coefficient of material (cm$^2$/gm)
$\rho$ = Bulk density of material (gm/cm$^3$)
$\mu_m$ is a function of the radiation source energy (MeV) and material electron density.

"I" is controlled by changing t, $\mu_m$ and $\rho$. $\mu_m$ can be controlled by changing the material(s) of the source sub configuration. $\rho$ is controlled by changing the material(s) and the bulk density of material(s) of the source sub configuration.

The source sub can be made out of various materials having different $\mu_m$ and $\rho$ properties in order to control the output intensity. Combinations of materials can be used to obtain the desired output intensity. Thickness of the source sub can be used to control the output intensity. Multiple material layers (cylinders) of different $\mu_m$, $\rho$ and t can be combined to control the output intensity.

The ability to change all material properties and thickness that surround the source out to the outer surface of the source sub can be used to control the output intensity.

Multiple cylinders can be incorporated in the source sub configuration that can be introduced and removed from between the source and the outer surface of the source sub to control the output intensity. The material of movable cylinder(s) can vary with distance allowing it to be moved along the sub axis until the desired output intensity is accomplished. Shifting this layer while downhole can provide the ability to gather more than one dataset where the optimum configuration is not known or where wellbore geometries or conditions vary across different depth intervals.

The source sub length between sources and detector can be changed by changing subhousings to a housing having a different length between the source and detector.

The source sub length can be adjusted to change the area of investigation. The source sub length can be adjusted while operating downhole to optimize the measurements. This enables more than one configuration to be used to iteratively find the optimum configuration. It also allows for optimal measurements in a wellbore having more than one geometry or condition at different depth intervals.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of varying output radiation for a nuclear source for evaluating degree of gravel pack in a predefined annulus between a tubing and wellbore inside, comprising:
   providing a downhole tool housing the nuclear source, said tool adapted to sense data in said tool corresponding to nuclear energy received by at least one (1) detector carried by said tool in response to nuclear energy generated by the nuclear source;
   varying output radiation intensity for the nuclear source; and
   varying an electron density for a source housing surrounding the nuclear source.

2. The method of claim 1 wherein varying the election density for the source housing further comprises:
   varying a thickness for the source housing surrounding the nuclear source.

3. The method of claim 1 wherein varying the electron density for the source housing further comprises:
   sliding a sleeve made of a material having an electron density over the nuclear source to alter the gamma ray intensity output from the source housing.

4. The method of claim 1, further comprising:
   providing a borehole eliminator between the source and the detector to prevent gamma rays from traveling directly from the nuclear source to the detector thereby enabling the tool to operate in larger diameter boreholes.

5. The method of claim 1 wherein varying the election density for the nuclear source further comprises:
   sliding a sleeve made of a material having a variable electron density over the nuclear source to alter the gamma ray intensity output from the source housing.

6. The method of claim 1, further comprising:
   conveying said tool by a conveying member selected from a group consisting of a (i)wash pipe; (ii) slickline; (iii) electric wireline; and (iv) coiled-tubing.

7. A method of varying output radiation for a nuclear source for evaluating degree of gravel pack in a predefined annulus between a tubing and wellbore inside, comprising:
   providing a downhole tool housing the nuclear source, said tool adapted to sense data in said tool corresponding to nuclear energy received by at least one detector carried by said tool in response to nuclear energy generated by the nuclear source;
   varying output radiation intensity for the nuclear source; and
   varying an electron density for a source housing surrounding the nuclear source wherein varying the election density for the source housing further comprises varying a material from which the source housing is made.

8. A method of varying output radiation for a nuclear source for evaluating degree of gravel pack in a predefined annulus between a tubing and wellbore inside, comprising:
   providing a downhole tool housing the nuclear source, said tool adapted to sense data in said tool corresponding to nuclear energy received by at least one (1) detector carried by said tool in response to nuclear energy generated by the nuclear source; and
   varying an area of investigation for the tool by changing a source housing from a first housing having a first dimension between the source and detector to a second housing having a second dimension between the source and detector.

9. A method of varying output radiation for a nuclear source for evaluating degree of gravel pack in a predefined annulus between a tubing and wellbore inside, comprising:
   providing a downhole tool housing the nuclear source, said tool adapted to sense data in said tool corresponding to nuclear energy received by at least one detector carried by said tool in response to nuclear energy generated by the nuclear source; and
   varying an area of investigation for the tool by moving the source along a longitudinal axis thereby varying a distance between the nuclear source and detector.

10. An apparatus for evaluating degree of gravel pack in a predefined annulus between a tubing and wellbore, comprising:
    a conveying member adapted to be dispose in the wellbore;
    a nuclear source positioned on the conveying member;
    a housing surrounding the nuclear source and varying the output radiation of the nuclear source; and
    a downhole tool at an end of the conveying member, said tool adapted to sense data corresponding to nuclear energy received by at least one detector carried by said tool in response to nuclear energy generated by the nuclear source.

11. The apparatus of claim 10 further comprising:
    a plurality of source housings having a variable electron density.

12. The apparatus of claim 11 further comprising:
    a plurality of materials having different electron densities from which the plurality of source housings are made.

13. The apparatus of claim 11 wherein the plurality of source housings each have a different thickness for varying the output intensity from the plurality of source housings.

14. The apparatus of claim 11 further comprising:
    a movable sleeve made of a material having an electron density over the nuclear source; and an actuator to slide the sleeve over the source to alter the gamma ray intensity output from the source housing.

15. The apparatus of claim 10, further comprising:
    a borehole eliminator placed between the nuclear source and the detector.

16. The apparatus of claim 10 further comprising:
    a plurality of source housings for varying an area of investigation for the tool by changing a source housing from a first housing having a first thickness between the source and detector to a second housing having a second thickness between the source and detector.

17. The apparatus of claim 10, further comprising:
    an actuator for varying an area of investigation for the tool by moving the source along a longitudinal axis thereby varying the distance between the source and detector.

18. The apparatus of claim 10 further comprising:
    an actuator for sliding a sleeve made of a material having a variable electron density over the nuclear source to alter the gamma ray intensity output from the source housing.

19. The apparatus of claim 10, wherein said conveying member includes at least one of a member from a group consisting of a (i) wash pipe; (ii) slick line; (iii) electric wireline; and (iv) wiled-tubing.

* * * * *